(12) United States Patent
Ries-Mueller et al.

(10) Patent No.: US 6,547,692 B1
(45) Date of Patent: Apr. 15, 2003

(54) SYSTEM FOR ADJUSTING THE TENSION OF THE CONTINUOUS BELT COMPONENT OF A CVT

(75) Inventors: Klaus Ries-Mueller, Bad Rappenau (DE); Norbert Dressler, Illingen-Schutzingen (DE); Joachim Luh, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/762,646

(22) PCT Filed: Jun. 8, 2000

(86) PCT No.: PCT/DE00/01876

§ 371 (c)(1),
(2), (4) Date: Feb. 12, 2001

(87) PCT Pub. No.: WO00/76799

PCT Pub. Date: Dec. 21, 2000

(30) Foreign Application Priority Data

Jun. 12, 1999 (DE) .......................................... 199 26 902

(51) Int. Cl.⁷ .............................................. B60K 41/12
(52) U.S. Cl. ...................................................... 477/45
(58) Field of Search ............................................ 477/45

(56) References Cited

U.S. PATENT DOCUMENTS

| | | | |
|---|---|---|---|
| 5,218,541 A | | 6/1993 | Yukihiro et al. |
| 5,243,881 A | | 9/1993 | Takahashi |
| 5,259,272 A | * | 11/1993 | Yamamoto et al. ............ 74/866 |
| 6,050,913 A | * | 4/2000 | Reuschenbach et al. ...... 474/69 |
| 6,168,546 B1 | * | 1/2001 | Loffler et al. ................ 477/109 |

FOREIGN PATENT DOCUMENTS

| | | |
|---|---|---|
| DE | 4138765 | 7/1992 |
| DE | 196 48 722 | 7/1996 |
| DE | 196 22 448 | 2/1997 |
| EP | 0 451 887 | 10/1991 |
| EP | 0 733 890 | 9/1996 |
| EP | 0 759 518 | 2/1997 |

OTHER PUBLICATIONS

"Abstand, bitte!" mot, No. 15, Jun. 11, 1998.

* cited by examiner

*Primary Examiner*—Dirk Wright
(74) *Attorney, Agent, or Firm*—Walter Ottesen

(57) ABSTRACT

The invention proceeds from a system for adjusting the tension of a belt part (for example, a band) of a belt transmission mounted downstream of a vehicle engine. The belt transmission preferably is continuously adjustable with respect to its transmission ratio. A first means is provided for controlling (open loop and/or closed loop) the vehicle engine and a second means is provided for controlling (open loop and/or closed loop) the belt transmission. Here, a first signal is determined by the first means and this signal represents the engine torque of the vehicle engine and this signal is supplied by the first means to the second means. The tension is adjusted by the second means in dependence upon the first signal and a safety reserve. The essence of the invention is that the safety reserve is not fixedly pregiven; instead, it is determined in dependence upon various conditions. In this way, one achieves a reduction of the reserve pressure of the belt tensioning control and thereby reaches a better operating efficiency of the transmission and therefore a reduced fuel consumption.

18 Claims, 11 Drawing Sheets

SYSTEM FOR ADJUSTING THE TENSION OF THE CONTINUOUS BELT COMPONENT OF A CVT

FIELD OF THE INVENTION

The invention relates to a system for adjusting the tension of the belt of a continuously variable transmission.

BACKGROUND OF THE INVENTION

Such a system is described in FIG. 1 and is known, for example, from EP-A-0 451 887. This publication too relates to the adjustment of the tension of a belt means 1, usually a belt, in a continuous belt transmission 2 comprising belt means 1, a drive pulley 3 and an output pulley 4 which is driven by an engine 11.

To adjust the transmission ratio of a continuously variable belt transmission and the tension of the belt means 1, the drive pulley 3 comprises an axially stationary conical pulley half 7 and an axially movable conical pulley half 9 and the output pulley 4 comprises an axially stationary conical pulley half 8 and an axially movable conical pulley half 10. The drive pulley 3 is also known as the primary pulley and the output pulley 4 is also known as the secondary pulley. Pressing of the axially movable conical pulley halves 9 and 10 against the belt means 1 takes place in response to the build-up of a hydraulic pressure in the respective oil chambers 5 and 6. The desired transmission ratio of the continuously variable belt transmission and the required tension of the belt means 1 can be adjusted by a suitable selection of the applied pressures $P_{prim}$ and $P_{sec}$ in the oil chambers 5 and 6. For the force transmission from the engine 11 to the drive pulley 3, for example, a torque converter 12 and a planetary assembly 13 can be provided with clutches for forward and rearward travel. The engine 11 can also drive the pump 14 of the continuously variable belt transmission. A transmission control 18 comprises the electrical and hydraulic components for driving the continuously variable belt transmission. The transmission control 18 includes means for adjusting the pressure in the oil chamber 6 or in the oil chambers 5 and 6.

The tension of the belt means 1 is adjusted in one embodiment of the transmission control 18 utilizing the pressure $P_{sec}$ in the output end oil chamber 6.

The tension of the transmission means 1 is to be so adjusted that the efficiency of the continuously variable belt transmission is a maximum. On the one hand, it is to be prevented that the belt means 1 slips because of too low a tension and, on the other hand, the tension of the belt means 1 should not be too high in order to avoid high losses in the continuously variable belt transmission. To reconcile the two requirements, the torque transmitted from the drive pulley 3 to the output pulley 4 must be known as precisely as possible. The torque to be transmitted on the drive pulley 3 is determined primarily by the torque of the engine 11 and the torque amplification factor of the torque converter 12.

In U.S. Pat. No. 5,337,628 a method for adjusting the pressure $P_{sec}$ in the output end oil chamber 6 is described. In this method, the rotational angle $\alpha_{Dk}$ of the throttle flap 15 of the engine 11 is detected by a sensor 16. Furthermore, the rpm $N_{mot}$ of the engine 11, the rpm $N_{prim}$ of the primary pulley 3 and the rpm $N_{sec}$ of the secondary pulley 4 are measured with rpm sensors 19, 20 and 21 and conducted as corresponding signals to the transmission control 18. The angle position $\alpha_{Dk}$ of the throttle flap is measured by the sensor 16. The angle position $\alpha_{Dk}$, the engine rpm $N_{mot}$, the primary rpm $N_{prim}$, and the secondary rpm $N_{sec}$ are utilized in the transmission control 18 to adjust the tension of the belt means 1 by adjusting the pressure in the oil chamber 6.

To adjust the tension of the belt means 1, the engine torque to be expected is estimated with a characteristic field of the throttle flap angle and the engine rpm. The engine torque to be expected is converted into an expected primary torque in a characteristic field with the formed quotient of the primary rpm and the engine rpm. Thereafter, the computation of the required pressure $P_{sec}$ takes place in the output end oil chamber to adjust the tension of the belt element 1.

The use of the throttle flap angle $\alpha_{Dk}$ to estimate the torque has the disadvantage that the calibration of the throttle flap potentiometer must take place very precisely. Even a small deviation of the measured throttle flap angle from the actual throttle flap angle can, in the above method, lead to a considerable deviation between the expected engine torque and the actual engine torque. It is difficult to guarantee that the throttle flap angle will always be measured correctly. For this reason, the belt tension must be held above the required level with a higher safety reserve in that a pressure higher about the reserve pressure is adjusted in the output end oil chamber. This leads to higher losses in the transmission and in the pump. Furthermore, problems can occur for the estimate of the engine torque during dynamic driving conditions with greater time-dependent changes of the engine rpm.

U.S. Pat. No. 6,050,913 improves the above-mentioned adjustment of the belt tension in that, for example, a torque value, which is computed in the engine control apparatus, is applied to adjust the belt tension. Embodiments for determining the safety reserve are not be found.

In modern-day engine control systems, a detection of combustion misfires of one or several cylinders of the vehicle is mostly in use which computes an engine rough running value from fluctuations of the engine rpm. This value is compared to the applied threshold values. A combustion misfire is detected when the engine rough running exceeds the threshold value. For this purpose, reference is made to German patent publication 4,138,765. Problems can be caused in this context by various disturbance quantities on the engine rpm signal. Such disturbance quantities are, for example, mechanical defects of the transducer wheel in detecting engine rpm, charge differences of the individual cylinders (differences because of the combustion process) and torsion vibrations. These disturbance influences are adapted in normal operation for precise misfire detection which is described in German patent publication 196 22 448 and in European patent publication 0,733,890. This means that, after a completed adaptation, corrective values are available which are considered for a precise detection of the engine rpm.

Furthermore, distance control systems are known from the state of the art, for example, from the publication mot, no. 15, Jun. 11, 1998. These distance control systems detect the distance of a vehicle to a vehicle traveling ahead. In general, this takes place via a radar sensor. If the distance becomes too little, then these systems provide for brake interventions independent of the driver.

SUMMARY OF THE INVENTION

The task of the present invention comprises optimizing the belt tension and especially determining the safety reserve.

As already mentioned, the invention proceeds from a system for adjusting the tension of the belt part (for example, the band) of a belt transmission mounted downstream of the vehicle engine and preferably a belt transmission which is continuously adjustable in its transmission ratio. First means for controlling (open loop and/or closed loop) the vehicle engine and second means for controlling (open loop and/or closed loop) of the continuously variable transmission are provided. With the first means, a first signal is determined which represents the engine torque of the vehicle engine and is supplied by the first means to the second means. With the second means, the tension is then adjusted in dependence upon the first signal and a safety reserve.

The essence of the invention comprises that this safety reserve is not fixedly pregiven; instead, this safety reserve is determined in dependence upon various conditions. For this reason, one reaches a reduction of the lump-sum reserve pressure of the belt tension control and thereby an improved transmission efficiency and thereby a reduced consumption of fuel.

In a first embodiment of the invention, it is provided that, via the first means, a second signal is determined which represents the quality of the first signal. This second signal is then supplied from the first means to the second means whereupon the safety reserve is determined in dependence upon the second signal. The belt part, that is, the band, is thereby protected from excessive wear in situations wherein the engine torque is uncertain.

In a second embodiment of the invention, means are provided with which a deterioration value is determined which represents the wear and/or the deterioration of the belt part. The safety reserve is then determined in dependence upon the deterioration value. This embodiment considers that the contact pressure, which is necessary to avoid slip, is greatly dependent upon the deterioration or the wear of the belt part. This means that a new belt requires less contact pressure for the transmission of the same engine torque than an already deteriorated/worn belt. With the invention, one arrives at an optimized adaptation of the belt tension to the state of the belt.

In a third embodiment of the invention, three means are provided via which a third signal is determined. This third signal represents the brake action, which is to be adjusted at the vehicle wheels, and/or the yaw movement and/or the transverse movement of the vehicle. The third signal is then supplied by the third means to the second means and the safety reserve is determined in dependence upon the third signal. The advantage of this configuration comprises that abrupt torque changes which operate at the transmission output end are detected. In this way, provision can be made in time for increasing the belt tension.

A fourth embodiment of the invention provides that the second means is supplied with a fourth signal representing the rotational speed or the change of the rotational speed of at least one vehicle wheel. The safety reserve is then determined in dependence upon the fourth signal. In a similar manner as for the third embodiment, the background of this embodiment is that a conclusion can be drawn from the dynamic of the vehicle wheels as to abrupt torque changes which act at the output end of the transmission. If the wheel dynamic indicates such torque changes, then an increase of the belt tension can be advantageously and timely provided.

In a fifth embodiment of the invention, it is provided that fourth means are provided for the distance control mentioned initially which determines an intervention signal in dependence upon the detected distance to a vehicle traveling ahead. With this intervention signal, an intervention into the brake system of the vehicle is triggered or prepared. According to the invention, the safety reserve is determined in dependence upon the intervention signal. Abrupt torque changes, which act at the output end of the transmission, or torque in-couplings at the transmission can be caused also by brake interventions for the distance control. For this reason, it is advantageous to consider these torque changes in the determination of the belt tension.

In a sixth embodiment of the invention, it is provided that fifth means are provided which determine a roadway value at least by means of a sensor and this roadway value represents the unevenness of the roadway to be traveled by the vehicle. In this connection, a radar sensor can be considered having output signals which are applied also the initially-mentioned distance control. The safety reserve is determined in dependence upon the roadway value. This configuration is based on the consideration that abrupt torque changes at the transmission output and therefore at the belt can also occur because of an uneven roadway. In this case, the belt tension has to be correspondingly increased in order to prevent damage of the belt.

For the first embodiment, it can be provided that the second signal represents a quality of at least possible fluctuations of the first signal, that is, of the engine torque.

Here it is advantageously considered that the second signal (that is, the quality of the engine torque) is determined in dependence upon the tolerances of at least one sensor whose output signal is evaluated for controlling (open loop and/or closed loop) the vehicle engine. In this connection, it can be especially provided that:

the first sensor functions for the direct or indirect detection of the air mass supplied to the engine;

the sensor serves for detecting a temperature, which is evaluated for controlling (open loop and/or closed loop) the vehicle engine; and/or, the sensor serves to detect characteristics of the exhaust gas of the vehicle engine whose output signals are applied especially for detecting the air/fuel mixture supplied to the vehicle engine.

The sensor for direct or indirect detection of the air mass, which is supplied to the vehicle engine, can, for example, be configured as a hot-film air-mass sensor, an intake manifold pressure sensor or as a throttle flap potentiometer for measuring the angular position of the throttle flap.

In a further advantageous variation of the first embodiment, the second signal is determined in dependence upon a detected fault function in the operation of the vehicle engine. Here, it is especially provided that a fault function is then detected when:

combustion misfires are detected in one or several of the cylinders of the vehicle engine, especially by evaluating the detected engine rpm; and/or, a fault function of a sensor is detected whose output signal is evaluated for controlling (open loop and/or closed loop) the vehicle engine; and/or, an emergency operation of the first means is present and especially an electrical emergency; and/or, the fuel supply to individual cylinders of the vehicle engine is interrupted in reaction to a detected fault.

In another advantageous variation of the first embodiment, the second signal is determined in dependence upon the detected rough running of the vehicle engine. Here, it is especially provided that the detection of the rough running is dependent upon whether:

mechanical vibrations, especially torsion vibrations, are present in the drive train of the vehicle; and/or, the fuel supply to the individual cylinders of the engine is interrupted; and/or, the first means controls (open loop and/or closed loop) the engine in such a manner that vibrations in the drive train are countered (anti-jolt function, load-impact damping); and/or, a switchover between various modes of operation of the engine of the vehicle takes place; and/or, a detection is made that a pregivable quality of the roadway is present (detection of a poor roadway); and/or, the fuel tank is almost empty.

A switchover between various modes of operation of the vehicle engine can, for example, be a switchover between a homogeneous operation and a stratified operation of the engine in engines having direct gasoline injection.

Here, it can be provided that the second signal is determined in dependence upon stored adaptation values which represent the rough running of the vehicle engine wherein the adaptation values can be stored in dependence upon load and/or rpm.

In a last advantageous variation of the first embodiment, the second signal is determined in dependence upon inaccuracies which occur in the determination of the first signal. In this connection, the following can be provided:

that the second signal is determined in dependence upon the rpm of the vehicle engine; and/or, that, via the first means, an adaptation of the friction torque (that is, lost torques), especially at idle of the vehicle engine, is performed and the second signal is determined in dependence upon whether the adaptation is completed or not.

For the second embodiment, it can be provided that the deterioration value is determined in dependence upon the service life of the belt part. Here, it is especially provided that the deterioration value is further determined in dependence upon the operating conditions which are present during the duration of operation with these operating conditions including the driving performance of the driver, operating temperature and/or slippage of the belt part.

Here, it can be further provided that the deterioration value is determined in the second means and is there non-volatilely stored.

As a fourth embodiment, it can be provided that the fourth signal is supplied to the second means by the third means and the third means is configured as an anti blocking control system and/or a drive slip control system and/or a driving stability control system with which a brake torque, which operates on the vehicle wheels, can be adjusted for increasing driving stability.

For the sixth embodiment, it can be provided that at least one clutch is provided in the drive train of the vehicle and that the clutch is opened in dependence upon the roadway value and on detected fault cases, especially combustion misfires. Here, especially a converter bridging clutch can be considered via which a torque converter, which is provided in the drive train, can be bridged. Such an opening of the converter clutch can also be advantageous in the detection of combustion misfires described in the first embodiment.

Advantageously, and according to the invention, the safety reserve is determined as follows:

in the first embodiment, the tension of the belt part is increased when a lower quality of the first signal is present compared to the adjustment of the tension for the presence of a higher quality of the first signal;

in the second embodiment, the tension of the belt part is increased when a higher wear is present and/or a deterioration to a greater extent compared to the adjustment of the tension for the presence of a lower wear and/or a deterioration of a lesser extent;

in the third embodiment, the tension of the belt part is increased when a brake action or a yaw movement and/or a transverse movement of greater extent is present compared to the adjustment of the tension for the presence of a braking action and/or a yaw movement and/or a transverse movement of a lesser extent;

in the fourth embodiment, the tension of the belt part is increased for the presence of a higher rpm or the greater change of the rpm of at least of one of the wheels of the vehicle compared to the adjustment of the tension for the presence of a lower rpm or the smaller change of the rpm;

for the fifth embodiment, the tension of the belt part is increased for the presence of a braking intervention triggered by the fourth means (102); and, in the sixth embodiment, the tension of the belt part is increased for the presence of an unevenness of the roadway of greater extent compared to the adjustment of the tension for the presence of an unevenness of lesser extent.

It is especially advantageous that first a voltage value is determined which is dependent upon the first signal, that is, on the engine torque. This base value is then modified or increased in dependence upon the safety reserve. Here, it is especially provided that the adjustment of the tension takes place hydraulically and the tension is adjusted by the input of at least one pressure value. Depending on the first signal, a pressure value (base value) is determined which is modified or increased in dependence upon the safety reserve.

BRIEF DESCRIPTION OF THE DRAWINGS

FIG. 9 shows the trace of the belt tension in dependence upon engine torque; whereas.

DESCRIPTION OF THE PREFERRED EMBODIMENTS OF THE INVENTION

The invention will be described in the following with respect to various embodiments.

Figure 1:
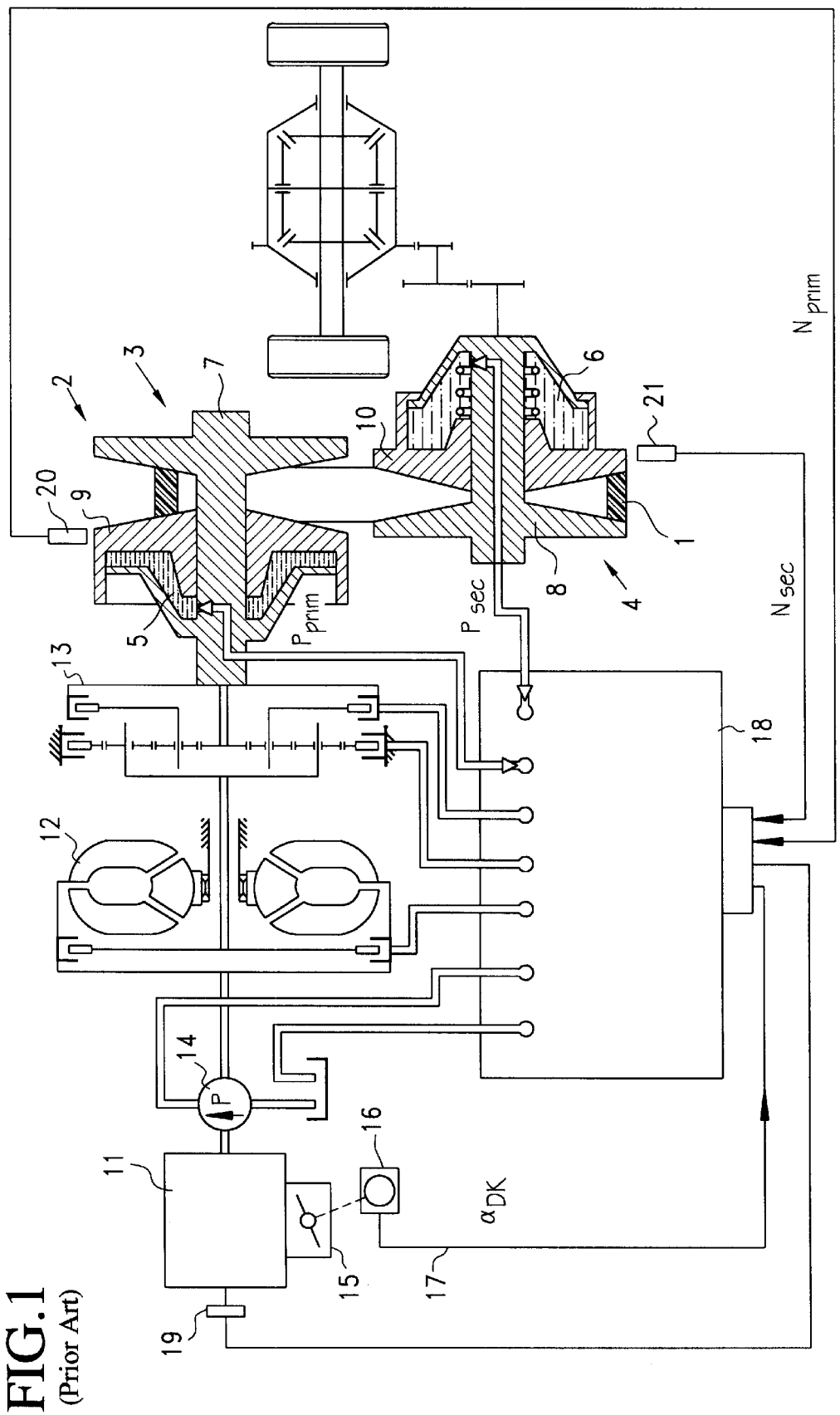
FIGS. 1 and 2 were at least partially already initially described and show the state of the art as a block circuit diagram while the overview block circuit diagram of FIG. 2 shows the essential elements of the invention.
Figure 2:
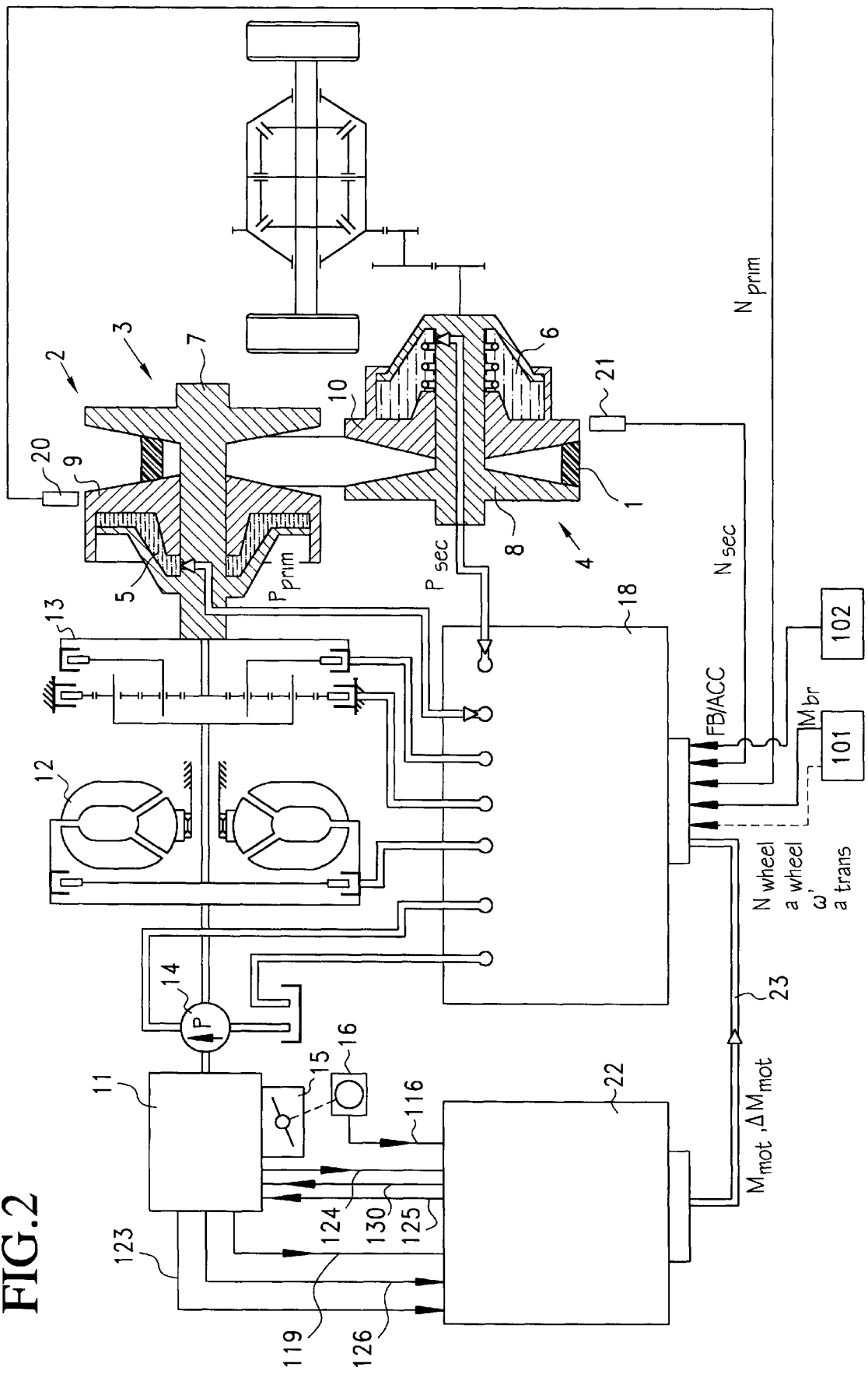

For this purpose, FIG. 2 first shows an overview block circuit diagram and the blocks, which are described with respect to FIG. 1, are provided with the same reference numerals.

FIG. 2 shows a continuously variable belt transmission with the transmission control 18 which is connected via the data line 23 to the engine control 22 which controls the internal combustion engine 11. One or several signals from the engine control 22 can be transmitted via the data connection 23 to the transmission control 18. In the figure, the engine torque $M_{mot}$, which is important for this invention, and the quality $\Delta M_{mot}$, that is, the possible fluctuations of the engine torque are seen as data.

For controlling the engine 11, the engine control 22 receives various signals as to the operating state of the engine via the connections 116, 119, 123, 124 and 126. The actuators of the engine 11 are driven via the connections 125 and 130.

Furthermore, a braking control unit and a distance control unit are identified in FIG. 2 by the reference numerals 101 and 102.

The brake control unit 101 is configured, in general, as an anti-blocking control system, drive-slip control system and/or a driving stability control system. These systems control the vehicle brakes in such a manner that a blocking and/or a slippage of the wheels is avoided and/or the driving stability is increased. In general, the following are present in the brake control unit 101: the actual braking torque $M_{br}$ which acts on the wheels; the yaw rate $\omega'$ which acts on the vehicle; and/or transverse acceleration, the wheel acceleration $a_{wheel}$; and/or the wheel rpm $N_{wheel}$. These quantities are supplied individually or in combination to the transmission control apparatus 18.

The distance control unit 102 detects the distance of the vehicle to an obstacle, that is, to a vehicle traveling ahead. Dependent upon this distance, for example, for increasing the distance, an active intervention in the vehicle brake can be made. This intervention is represented by the signal ACC which is supplied to the transmission control apparatus 18. Furthermore, the roadway characteristic FB can be detected via the distance control unit 102 and supplied to the transmission control unit 18.

Figure 3:
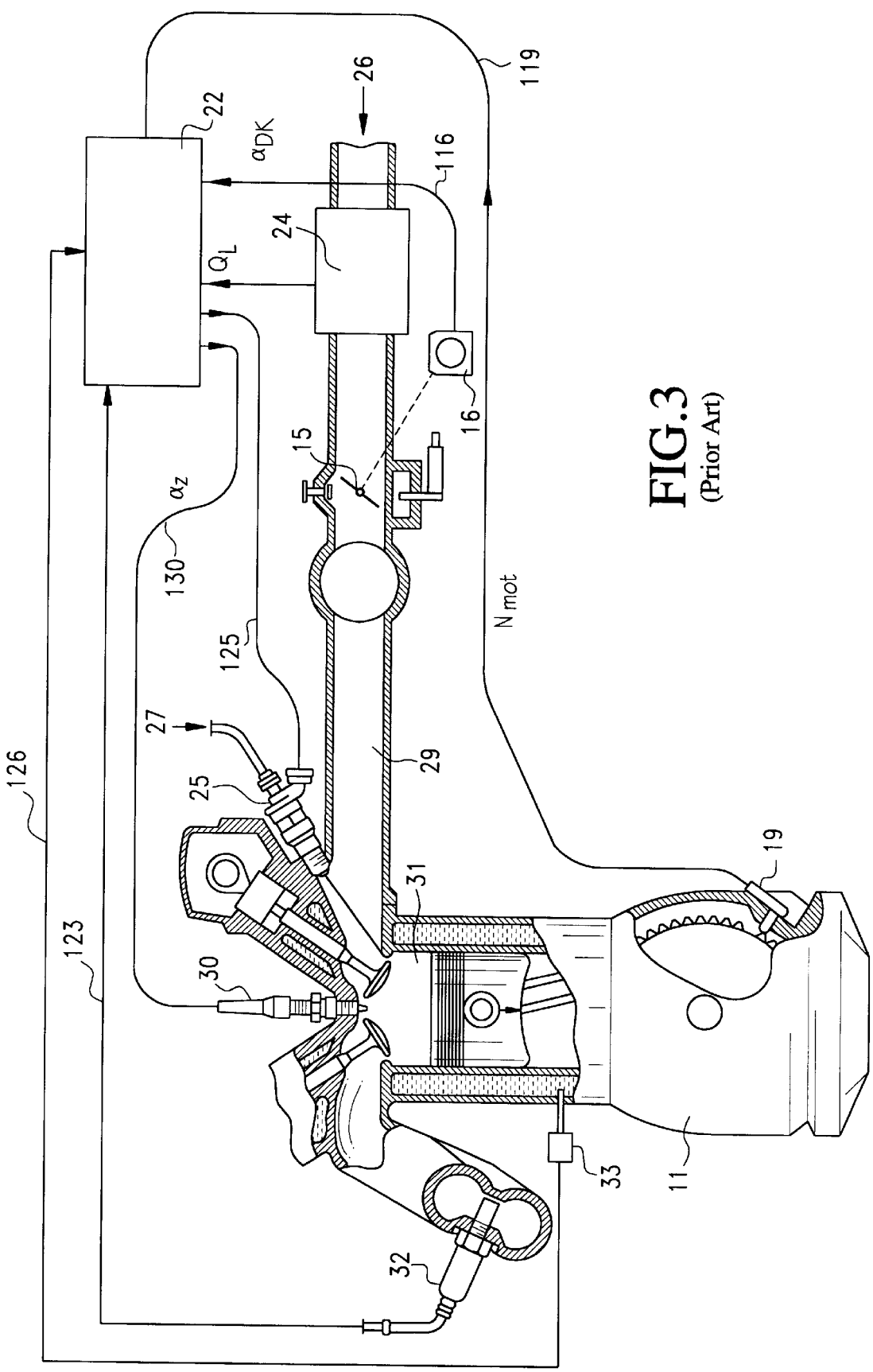
FIG. 3 is a schematic of an internal combustion engine showing the detection of signals and the signals with which the engine is driven.

FIG. 3 shows by way of example the detection of the signals 116, 119, 123, 124 and 126 and the driving of the internal combustion engine 11 with the signals 125 and 130. A cylinder of the internal combustion engine 11 is shown. With the rpm sensor 19, the signal 119 (the rpm $N_{mot}$ of the engine) is measured. The air mass $Q_L$ of the air 26 inducted into the intake manifold 29 is measured by a sensor 24 (air-mass sensor) and is transmitted as signal 124 to the engine control 22. With the signal 125, the engine control 22 actuates a device 25 for metering fuel 27. The fuel can, for example, be injected into the intake manifold 29. The device 25 can, for example, be a fuel injection valve. Furthermore, from the engine control 22, the drive $\alpha_z$ of the spark plugs 30 for igniting the air/fuel mixture in the interior of the combustion chamber 31 of the internal combustion engine 11 takes place with the signal 130. The composition of the exhaust gas is detected as signal 123 by the lambda probe 32 mounted in the exhaust-gas system. Furthermore, the engine temperature or the cooling water temperature is measured by means of the temperature sensor 33 and is supplied as signal 126 to the engine control apparatus 22.

The engine control 22 supplies, inter alia, signals 125 and 130 to control the internal combustion engine 11. This drive is, inter alia, dependent upon the signal 124 which gives the mass of the air inducted by the engine 11. The rpm $N_{mot}$ of the engine is supplied to the engine control 22 with the signal 119 and the angular position $\alpha_{Dk}$ of the throttle flap is supplied with the signal 116 to the engine control 22.

Figure 4:
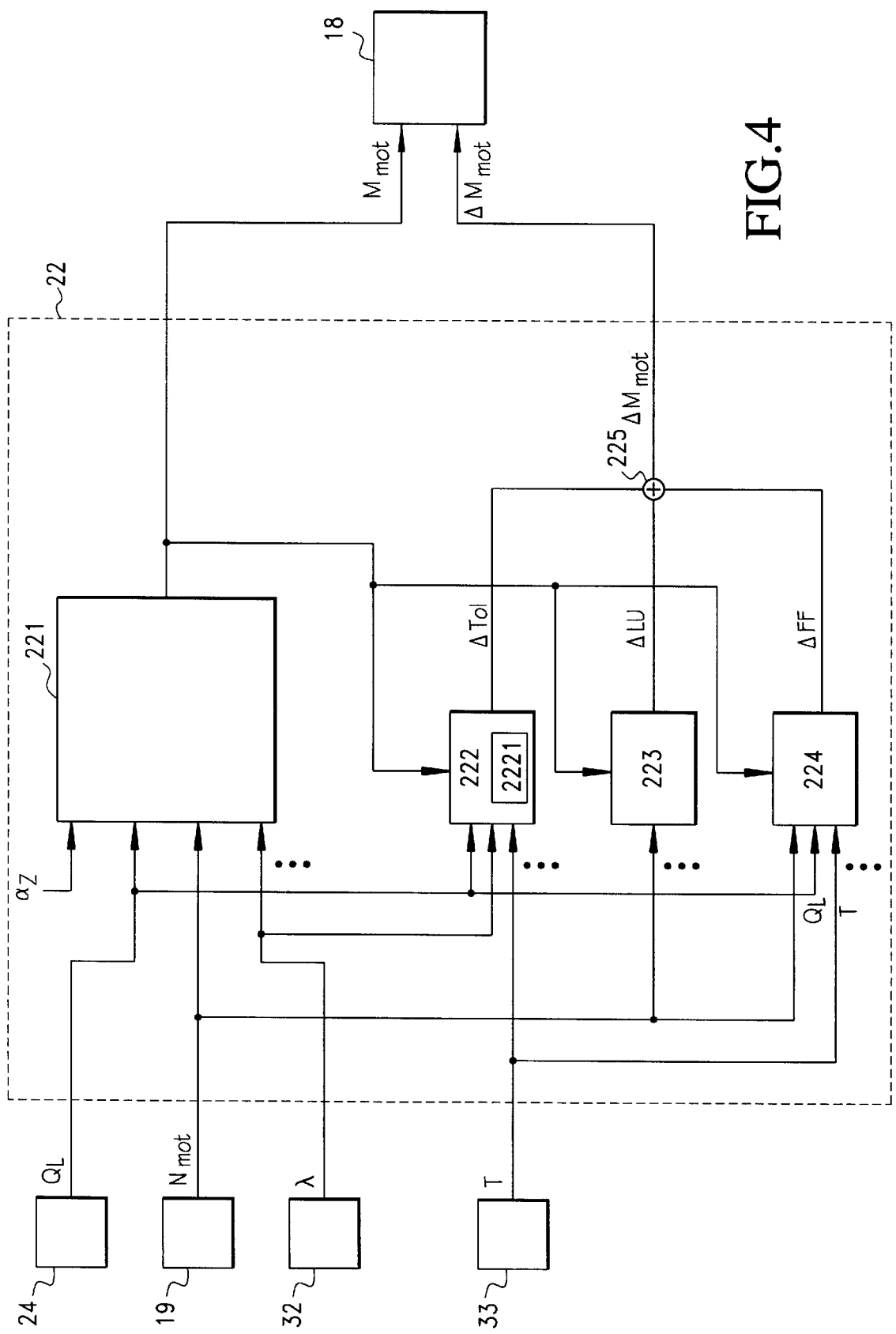
FIGS. 4, 5, 6, 7, 8 and 10 present the embodiments of the invention in detail with respect to block circuit diagrams.

The engine control 22 determines the engine output torque, which is to be expected, and transmits the result as signal $M_{mot}$ via the connection 23 to the transmission control 18. Methods are known from the state of the art for computing the torque, which is to be expected, from the signals 119 ($N_{mot}$), 124 (inducted air $Q_L$), 116 ($\alpha_{Dk}$), 125 (injection quantity) and 130 (ignition time point $\alpha_z$) The determination of the engine torque is shown in FIG. 4 with block 221 in the engine control apparatus 22.

Figure 8:
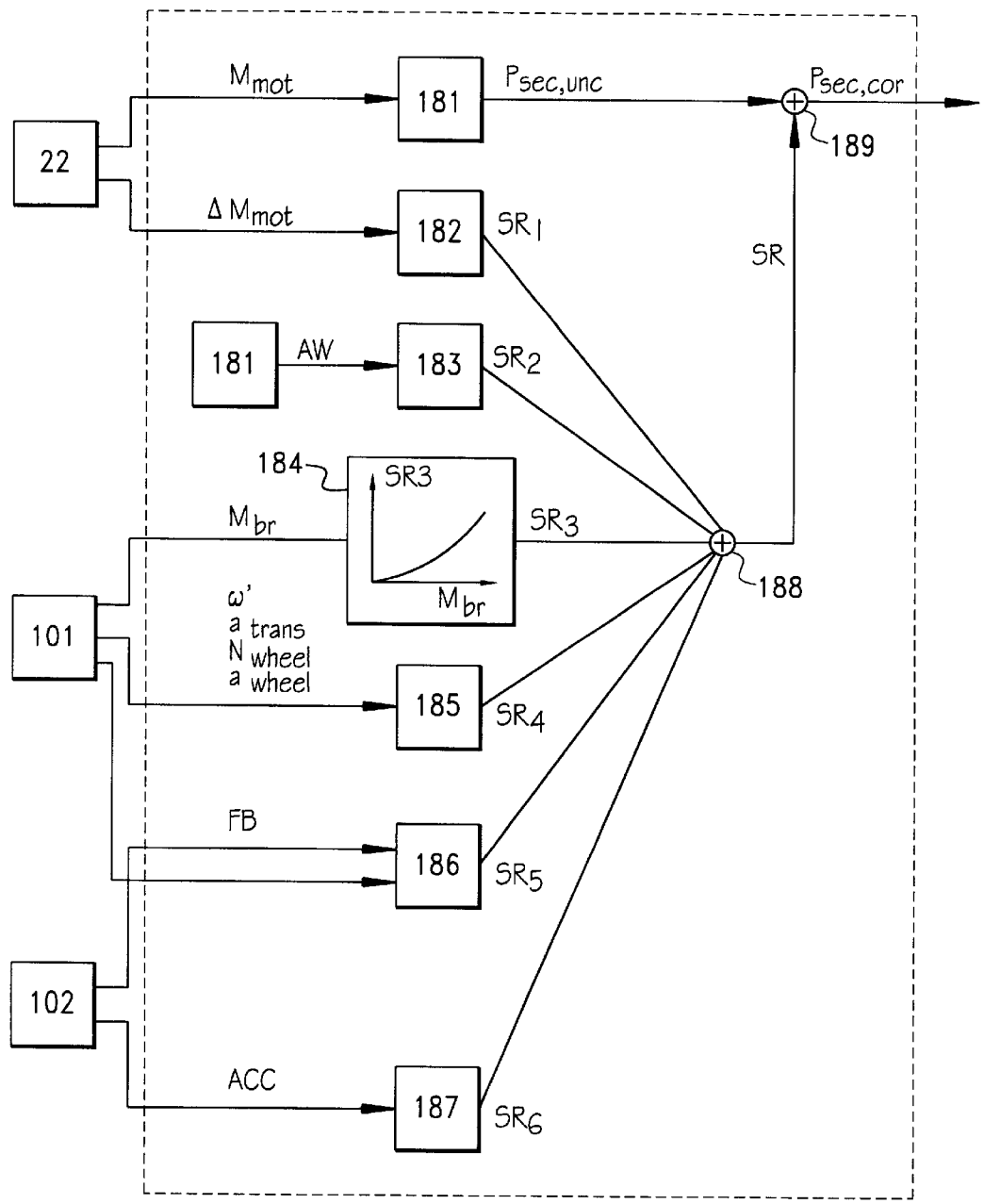

As shown in FIG. 8, the tension of the belt part is pregiven in the transmission control unit 18 essentially in dependence upon the expected or instantaneously adjusted engine output torque (signal $M_{mot}$) by the adjustment of the secondary pressure. This takes place in FIG. 8 with the block 181 via which first a preliminary desired value $P_{sec,unc}$ for the secondary pressure is formed in dependence upon $M_{mot}$. In addition, and as will be explained hereinafter, various components SR1 to SR6 are determined which are combined to a safety reserve value SR by the addition 188. The value SR is now coupled via the addition 189 with the desired value $P_{sec,unc}$ for the secondary pressure to form the value $P_{sec,cor}$. The value $P_{sec,cor}$ provides the secondary pressure, which is to be actually adjusted, and therefore the actual belt tension which is to be adjusted. The determination of the safety reserve SR is essential for the present invention.

The individual influence quantities to determine the safety reserve SR and therefore the adjustment of the tension of the belt part 1 are presented in the following.

Figure 9:
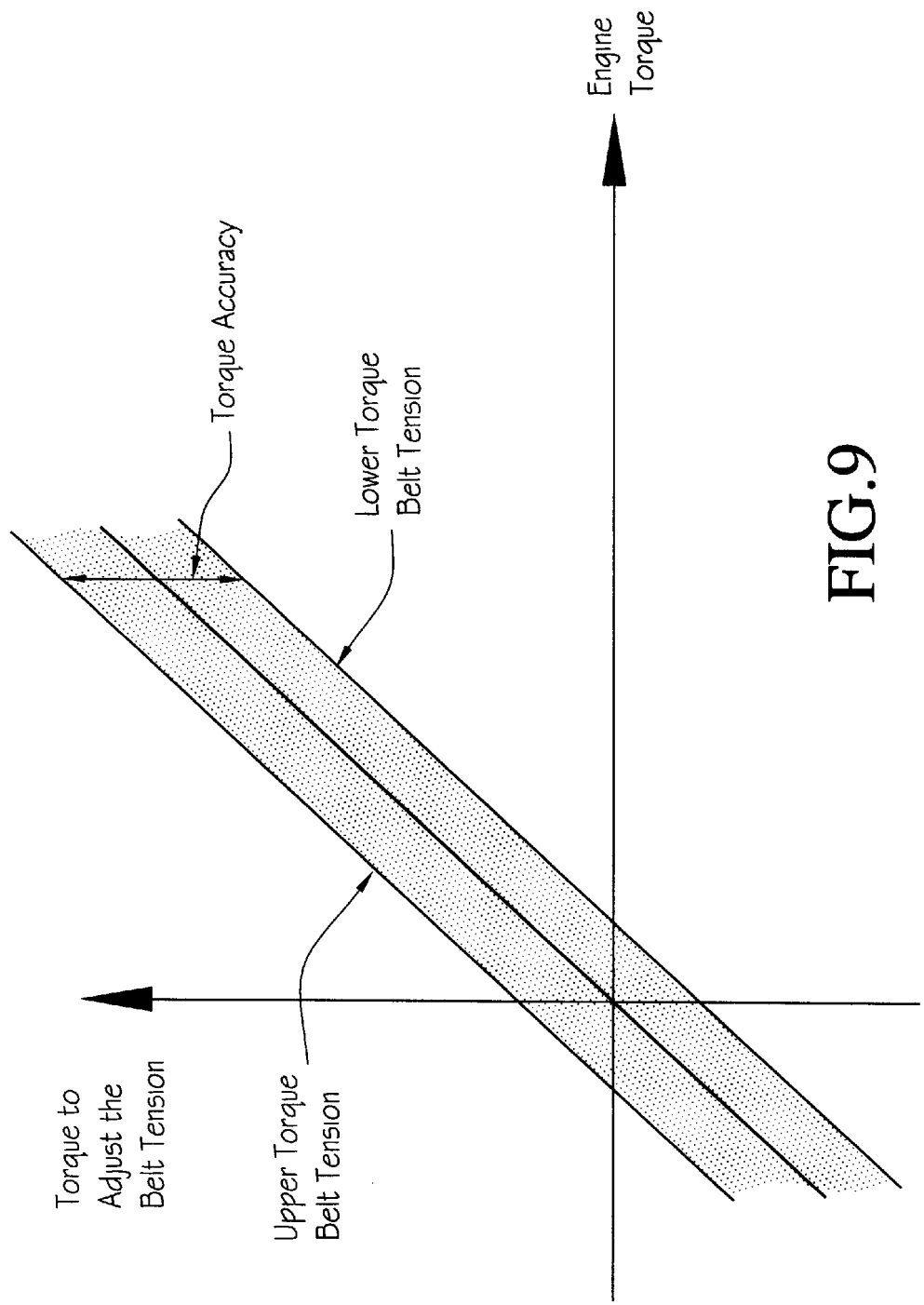

1. Determination of the Safety Reserve in Dependence Upon Engine End Influences:

The essence of this part of the invention comprises estimating how reliable and precise the engine output torque $M_{mot}$ is, which is determined, in general, in the engine control 22. Then, and according to the invention, the safety reserve SR is determined in dependence upon this "quality" $\Delta M_{mot}$. The transmission control 18 can adjust the belt tension, that is, the secondary pressure, with the signal $\Delta M_{mot}$ so that the belt 1 does not slip within a torque range. FIG. 9 should make this clear. The transmission control apparatus 18 derives a lower and an upper torque signal to adjust the belt tension from the signals "engine torque $M_{mot}$" and "torque accuracy $\Delta M_{mot}$".

The reliability and accuracy of the engine output torque (signal $M_{mot}$), which is expected or instantaneously adjusted, is dependent essentially on the following factors:

Tolerances of the sensors whose output signals are evaluated for controlling (open loop and/or closed loop) the vehicle engine 11. Here, especially the tolerances of the sensors are important whose output signals are applied to determine the engine torque $M_{mot}$. For this purpose, the value $\Delta$Tol is formed in block 222.

Fault functions of the vehicle engine 11. For this purpose, the value $\Delta$FF is formed in block 224.

Rough running of the vehicle engine 11. For this purpose, the value $\Delta$LU is formed in block 223.

Inaccuracies, which occur in the determination of the engine torque $M_{mot}$. This is considered via the value $\Delta$Tol formed in block 222.

As shown in the figure, the quality $\Delta M_{mot}$ of the engine torque is determined in the addition unit 225 of the engine control 22 in dependence upon these factors $\Delta$Tol, $\Delta$LU, and $\Delta$FF. The quantity $\Delta M_{mot}$ is supplied to the transmission control 18. As will be described hereinafter, the signal $\Delta M_{mot}$ contributes to the formation of the belt tension in transmission control apparatus 18 in the sense that, with increasing $\Delta M_{mot}$, the safety reserve for the belt tension is increased.

1a. Sensor Tolerances and Inaccuracies (Block 222/FIG. 4):

The determination (block 221 in FIG. 4) of the engine torque $M_{mot}$ in the engine control apparatus 22 is subjected to various tolerances and uncertainties. The engine torque $M_{mot}$ is, for example, computed from the measured air mass $Q_L$. The air-mass sensor 24 has, however, tolerances. Furthermore, the friction torque of the engine 11 is adapted at idle, for example, in engine control systems in modern-day series, that is, adapted in the sense of a learning. This means, that an adaptation of the friction torques or lost torques is performed via the engine control 22. This happens especially at idle of the vehicle engine. This adaptation means, however, that after building in a new engine control apparatus 22, the torque signal $M_{mot}$ is at first less accurate than after completed adaptation.

Thus, a flag can be provided, for example, in the sequence of the engine control apparatus which indicates whether the engine torque is accurate or inaccurate. This data is, however, too coarse.

This problem is solved in accordance with the invention in that a signal ΔTol is determined in the engine control 22. This signal ΔTol indicates the quality of the engine torque $M_{mot}$ while considering the inaccuracies and tolerances.

With the addition 225, the signal ΔTol is then superposed on still further components to be described and is supplied as a quality or "torque inaccuracy" $\Delta M_{mot}$ to the transmission control 18.

For example, the engine control 22 can select the signal ΔTol and therefore the torque inaccuracy higher than in situations in which the accuracy of the engine torque is greater. This selection is in block 222 in operating ranges in which the engine torque $M_{mot}$ is inaccurate in accordance with experience.

Furthermore, the signal ΔTol could be large at the start of the mentioned friction torque adaptation. After detecting the end of the adaptation, the signal $\Delta M_{mot}$ can again become smaller.

The torque tolerance or inaccuracy ΔTol comprises essentially operating point dependent percentage errors (for example, because of the tolerances in the detection of inducted air $Q_L$) and absolute errors which are not operating point dependent (for example, the mentioned adaptation of the lost torque which was not carried out).

These individual components of the tolerances and inaccuracies are computed in block 222. For this purpose, the output signals of the most important sensors are supplied to block 222. The determination of $M_{mot}$ is based on the output signals of these sensors. Such sensors are presented in FIG. 4 and are exemplary: the air-mass sensor 24, the lambda probe 32, the engine rpm sensor 19 and the engine temperature sensor 33.

A memory 2221 is provided in block 222 for storing the data to determine the absolute and relative tolerances and inaccuracies.

The transmission control 18 can adjust the secondary pressure $P_{sec}$, and therefore the belt tension, with the resulting signal $\Delta M_{mot}$ so that the belt 1 does not slip within a torque band. This is shown with respect to FIG. 9 already described.

By considering the sensor tolerances and inaccuracies already described in this section, one obtains a protection of the belt 1 against wear in situations wherein the engine torque $M_{mot}$ is inaccurate.

Figure 6:
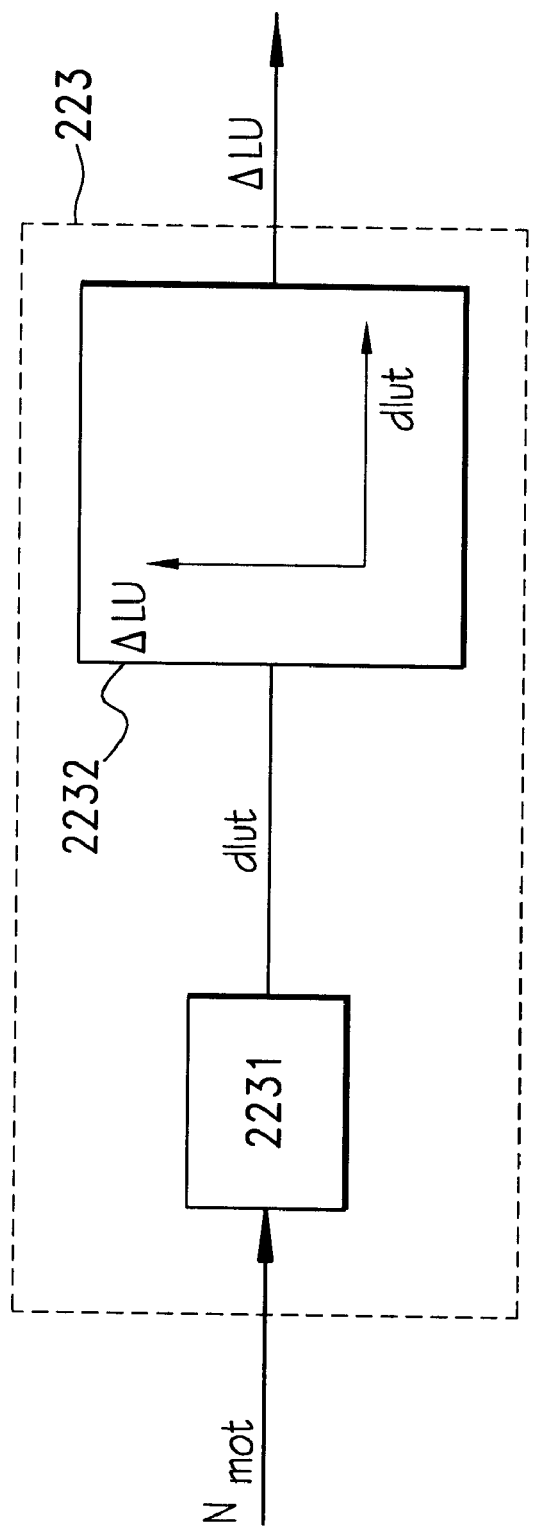

1b. Rough Running of the Vehicle Engine (Block 223/ FIGS. 4 and 6):

In this section, a description is provided as to how the rough running of the vehicle engine 11 is considered. Because of an increased rough running, abrupt engine end (transmission input end) torque changes can occur. For this reason, the belt tension must be timely increased.

As possible causes for an increased rough running, the following are considered:

intense torsion oscillations in the drive train of the vehicle;

cylinder cutoffs. Here, with the presence of specific operating states, a portion, for example, half of the cylinders, are switched off in engines having many cylinders, inter alia, for reasons of energy savings;

high ignition angle changes or injection time changes (for diesel direct injection or gasoline direction injection), for example during an intervention to counter rocking in the drive train (anti-rock intervention, load impact damping);

driving with an almost empty fuel tank;

a switchover between various operating modes of the vehicle engine. For example, for engines having gasoline direct injection, it is known to switch over between a so-called homogeneous operation and a stratified operation depending upon the operating condition;

travel over a poor roadway, that means, over a roadway of low quality. In this portion of the description, the rough running is viewed as an effect of driving a poor roadway. In a following section of this application, it is described how a signal FB is determined, which represents the roadway quality, from the evaluation of other quantities not directly interconnected with the engine control.

The determination of the rough running is known per se, for example, from the state of the art mentioned initially herein and is implemented in modern engine control apparatus. In FIG. 4, a block 223 is shown in engine control apparatus 22 which will be explained in greater detail with respect to FIG. 6.

The engine rpm $N_{mot}$ is supplied to the block 223. The engine rpm $N_{mot}$ is processed in block 2231 to a signal dlut which represents the rough running. In block 2231, a corresponding algorithm is implemented for this purpose. In block 2232, a characteristic field is stored which assigns various values ΔLU to various rough running values dlut. As will still later be described, the values ΔLU contribute to the formation of the belt tension via the addition 225 in transmission control apparatus 18 in the sense that the belt tension is increased with increasing rough running.

1c. Fault Functions of the Vehicle Engine (Block 224/ FIGS. 4 and 5):

In this section, a description is provided as to how fault functions of the vehicle engine 11 are considered. Such fault functions can lead to abrupt engine end torque changes. For this reason, the belt tension must be timely increased.

As possible causes for such fault functions, the following can be considered:

combustion misfires, that means, disturbances in the individual combustion operations in the internal combustion engine 11;

defects of sensors whose output signals are applied for the determination of the engine torque $M_{mot}$;

cylinder cutoffs as a consequence of various fault functions such as detected combustion misfires, defective injection valves and defective ignition system;

an electrical emergency operation of the engine control unit 22.

These possible causes are determined in block 224 of FIG. 4. This block 224 is described in greater detail with respect to FIG. 5.

For Determining Combustion Misfires (Block 2241):

In modern engine control systems, a detection of combustion misfires is implemented as standard which computes the already mentioned engine rough running value dlut in block 22411 from fluctuations of the engine rpm $N_{mot}$. This engine rough running value dlut is compared in block 22413 to an adapted (applied) threshold value Lur. If the engine rough running dlut exceeds the threshold value Lur, then a misfire is detected and the value Δ1 is formed. The threshold Lur is determined in block 22412 in dependence upon the engine rpm $N_{mot}$ and the air mass $Q_L$. For this purpose, reference is made, by way of example, to the state of the art mentioned initially herein. The value Δ1 can be fixedly pregiven.

To Determine Sensor Defects (Block 2242):

Here, the concern is to consider possible defects of sensors whose output signals are applied for determining the engine torque $M_{mot}$. Thus, a failure of the air-mass sensor 24, for example, leads to an imprecise torque signal $M_{mot}$. The air-mass sensor 24 can be configured as a known hot-film air-mass sensor.

Figure 5:
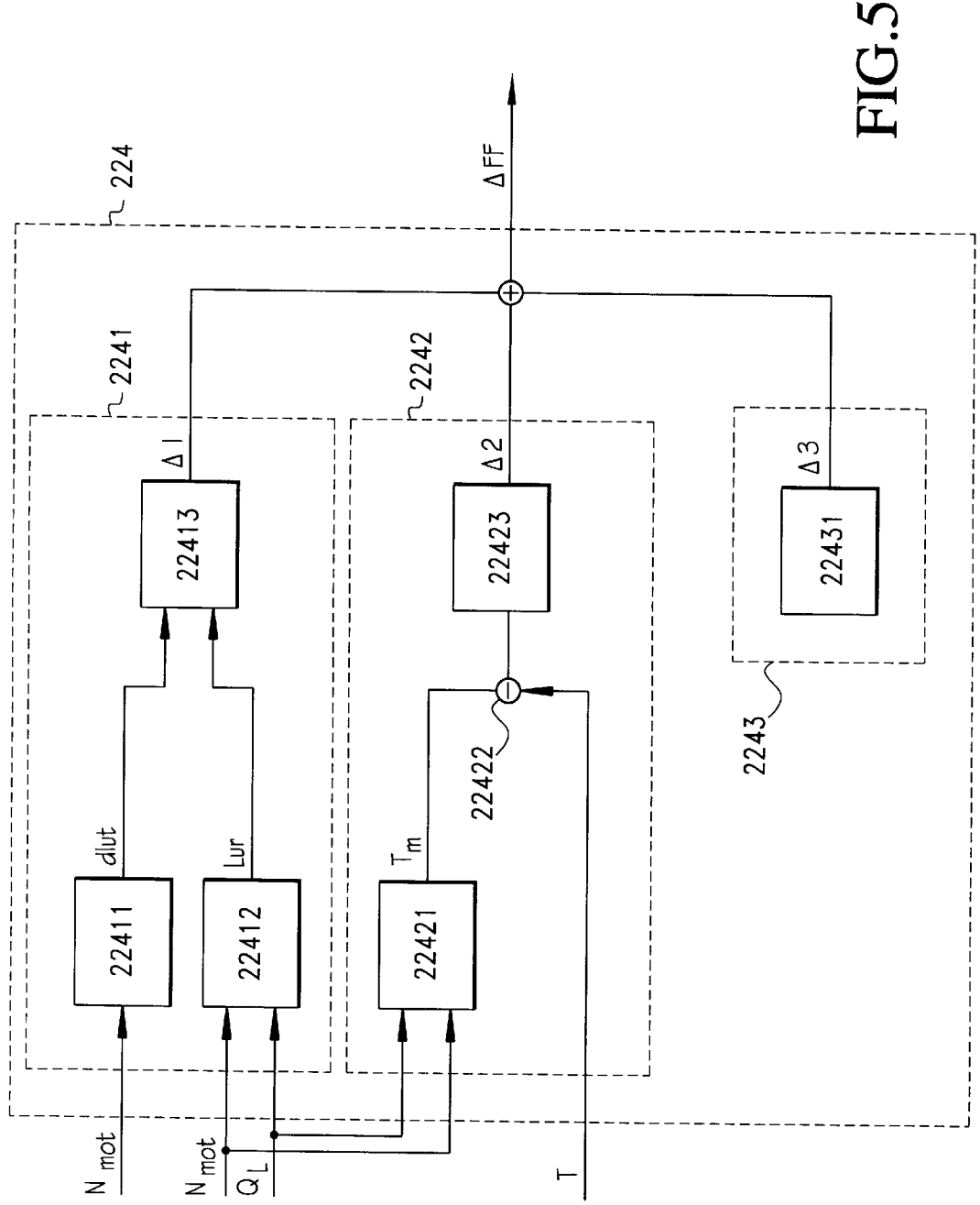

In this connection, in block 2242 of FIG. 5, the monitoring of the engine temperature sensor is shown by way of example. For this purpose, a model temperature Tm is determined in block 22421 in dependence upon the engine rpm $N_{mot}$ and the air mass $Q_L$ by means of a stored temperature model and, at point 22422, is subtracted from the measured temperature T. If it is determined in block 22423 that the difference exceeds a threshold value, then this permits a conclusion to be drawn as to a defective temperature sensor 33. In this case, a value Δ2 is formed which can be fixedly pregiven.

Additional (Block 2243):

If the engine control is in electrical emergency and/or if a cylinder cutoff (cutoff of the fuel metering to individual cylinders of the vehicle engine) takes place as a consequence of various fault cases, then a value Δ3 is formed in block 22431 which can be fixedly pregiven.

2. Determination of the Safety Reserve in Dependence Upon the Deterioration and/or Wear of the Belt Part (FIG. 7):

As already mentioned, the adjustment of the belt application pressure should find an optimum between minimum pressure losses, on the one hand, and the belt slippage, which is to be avoided, on the other hand. The application pressure, which is necessary to prevent slippage, is greatly dependent upon the deterioration or the wear of the belt 1. This means that a new belt 1 requires a lesser application pressure for the transmission of the same engine torque than a belt which is already deteriorated or worn.

A certain fixedly pregiven pressure reserve can be adjusted in operation in order to consider various stages of deterioration or wear of a belt. This means that a new belt is operated with additional pressure, which is not absolutely needed.

The essence of this part of the invention is to estimate the deterioration or the wear of the belt and to determine the safety reserve for the belt tension in dependence thereon.

Figure 7:
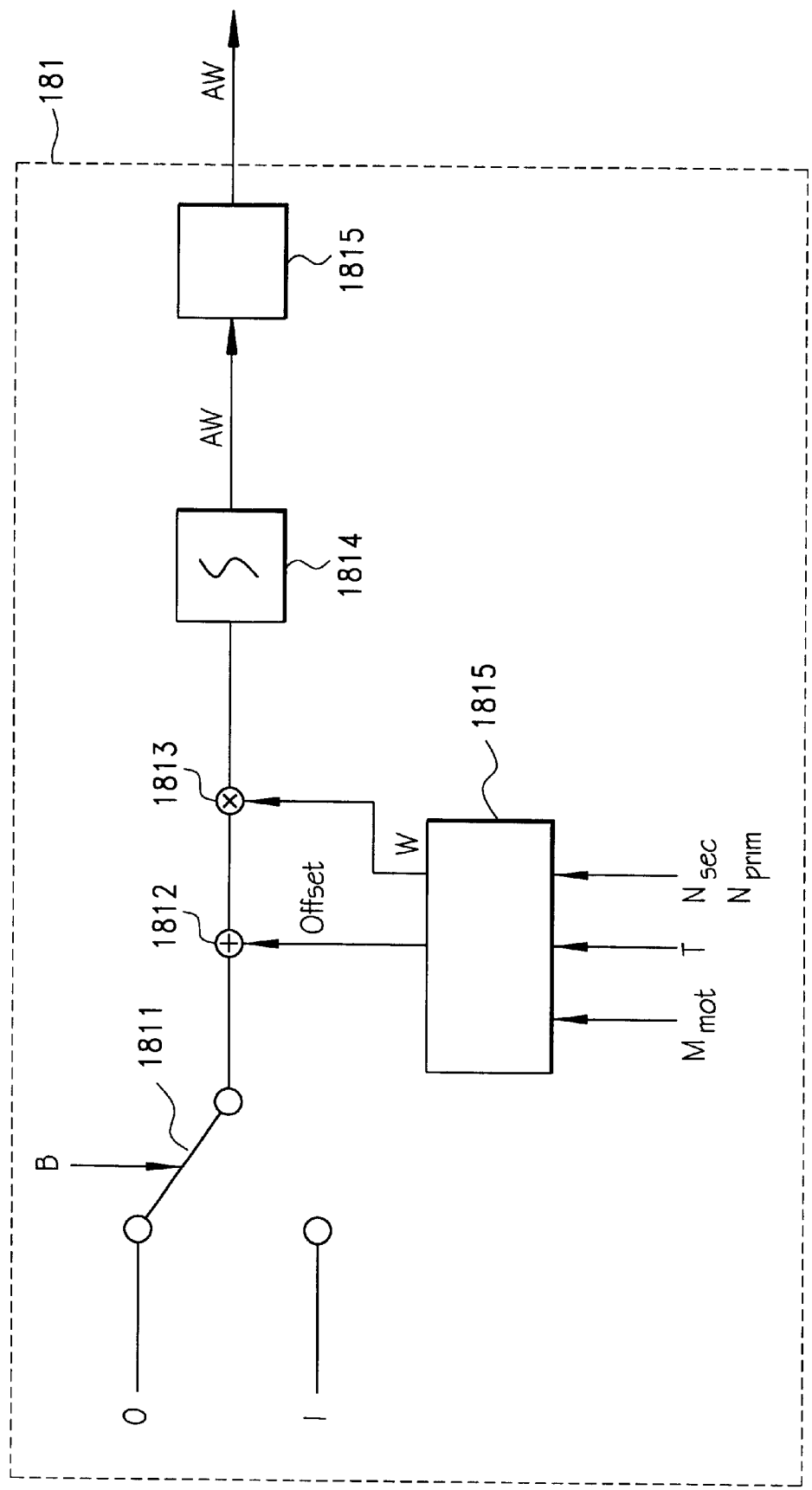

For this purpose, the circuit arrangement shown in FIG. 7 is always then connected to voltage (position "1") by the signal B, that is, by the switch 1811, when the vehicle and therefore the transmission is in operation. Otherwise, the switch 1811 assumes the position "0" without voltage. The voltage, which is applied to the block, is integrated by the integrating unit 1814 to the deterioration value AW. If one first does not consider the addition 1812 and the multiplication 1813, then the deterioration value AW is initially only dependent upon the operating time of the belt.

The deterioration or wear of a belt 1, especially of a push element belt, is however greatly dependent upon the driving performance and/or the operating conditions under which it is operated. The various influences are considered via a value "offset" (addition 1812) and a weighting value W (multiplication 1813).

In block 1815, the actual driving situation with reference to the wear of the belt 1 is evaluated with the aid of a situation detection. From this, the values "offset" and W are derived. The situation detection can, for example, consider the vehicle dynamic.

To form the values "offset" and W, the following are supplied to this block: the actual engine torque $M_{mot}$, the transmission temperature T and the primary and secondary rpms ($N_{prim}$ and $N_{sec}$).

Temperature influences are considered in the formation of the weighting value W in block 1815 via, for example, the transmission temperature T. For example, an operating time span at high transmission temperature and therefore at high belt temperature has a greater influence in the integration 1814 than an operating time span at low transmission temperature and therefore at low belt temperature.

The value "offset" functions to consider abrupt deterioration or aging. For example, if a belt slippage occurs which can be determined by the difference between the primary rpm $N_{prim}$ and the secondary rpm $N_{sec}$ for the same transmission ratio, then a local damage or intense deterioration or intense wear of the belt 1 occurs.

The deterioration value AW, which is present at the output of the integration unit, is stored in the non-volatile memory 1815 (EEPROM) and is supplied to the block 183 (FIG. 8) during operation of the vehicle. The storage 1815 is therefore advantageous in that, in case the storage value AW is lost, it is not necessary, as previously, to switch over to an adequate safety reserve independent of wear.

In block 183, a value SR2 for the safety reserve is determined in dependence upon the deterioration value AW, for example, by means of a characteristic line. The deterioration or the wear of the belt is not considered in the formation of the uncorrected belt tension, that is, the uncorrected secondary applied pressure $P_{sec,unc}$ in block 181 (FIG. 8). With the additions 188 and 189, the service life or wear-dependent safety reserve SR2 is added to the uncorrected value.

3. Determination of the Safety Reserve in Dependence Upon the Vehicle Dynamics (Block 185/FIGS. 8 and 10):

In order to find an optimum between the minimum pressure losses, on the one hand, and the belt slippage, which is to be avoided, on the other hand, in the adjustment of the belt applied pressure, it is intended, in this part of the embodiment, to influence the applied pressure, which is necessary to prevent slippage, in dependence upon the driving dynamic of the vehicle. The background for this is that driving conditions (such as high acceleration, deceleration or skidding of the vehicle) can cause abrupt output end (acting at the transmission output) torque changes or torque incouplings at the transmission. Data as to such driving conditions are, in general, present in the corresponding control apparatus (101, FIG. 2) or control apparatus components. Here, especially known anti-blocking systems (ABS), anti-slip systems (ASR) and/or driving stability systems (FDR, ESP) are intended which increase the driving stability via brake interventions and/or propulsion interventions.

Possible causes for the torque incoupling via the transmission output are:

slipping tires in the drive-slip control operation;

block braking or intense braking in the anti-blocking control operation;

driving dynamic intervention (for example, braking intervention independent of the driver and braking intervention on an individual wheel) in order to prevent a skidding of the vehicle; and, driving over a poor roadway.

In the above-mentioned control apparatus (101, FIG. 2), the cases, in which such torque incouplings can occur, are in general detected or corresponding signals are present for the detection. These signals have to be transmitted to the transmission control apparatus 18 in order to there initiate a corresponding reaction such as the increase of the belt tension by a value SR3 or SR4 (blocks 184, 185, FIG. 8).

The belt tension $P_{sec,unc}$ (desired secondary pressure) can, for example, be increased dependent upon a brake torque $M_{br}$, which is computed in the control apparatus 101 in a standard manner, by the safety reserve SR4. This means that, for an increased brake torque $M_{br}$, the belt tension or the secondary pressure is increased by a pregiven amount. This is shown schematically in FIG. 8 with the block 184. The brake torque $M_{br}$ is supplied to this block and the safety reserve SR3 is determined by means of a characteristic line. The brake torque $M_{br}$ can, for example, be transmitted via a data line 23 (for example, a controller area network CAN) to the transmission control apparatus 18.

The brake torque $M_{br}$ is computed in the control apparatus 101, in general, in dependence upon:

- the measured brake pressure of the brake pedal (driver dependent brake interventions); and,
- the estimated brake torque in driver independent brake interventions (without brake pedal actuation).

The signal $M_{br}$ affords the advantage that it indicates very early a brake intervention, which is about to occur. This means that the signal $M_{br}$ already indicates the brake intervention and therefore possible torque jumps at the transmission output in advance of the actual brake intervention (in general, increase of the brake hydraulic pressure in the brake system) and in advance of the actual deceleration of the vehicle. The belt tension can thereby be timely increased before torque fluctuations are coupled in via the drive train.

Furthermore, it can be distinguished at which axle or at which wheel the brake torque $M_{br}$ occurs. The torque incouplings critical for the belt occur only at the drive axle. For this reason, only the brake interventions at the drive axle have to be considered for the belt tension.

In a very simple configuration, it can be provided that, for a brake intervention, the applied pressure $P_{sec,unc}$ is increased by the fixedly pregiven safety value SR3 by the control apparatus 101.

Clutches are generally provided in the drive train. It can be provided that, in a brake intervention, a complete or partial opening of the clutch or clutches is provided to avoid a blocking of the wheels (ABS intervention) or even generally for an intense braking operation. In this way, the torque, which is to be transmitted by the belt, can be limited. Furthermore, an available clutch for bridging the converter 12 (see FIG. 1) should be opened. In a special embodiment, the opening of the clutches can be provided for only a specific time span until the converter clutch is opened. After opening of the clutch or clutches, the reclosing (open loop controlled and/or closed loop controlled) has to take place in such a manner that virtually no jolt occurs in the drive train.

An opening of the clutch can constitute a hindrance in a brake intervention for increasing the driving stability. For this reason, the control apparatus 101 can continue to transmit a signal (not shown) to the transmission control 18 which indicates whether an opening of the clutch is permitted. Likewise, the control apparatus 101 could conduct a signal (not shown) to the transmission control 18 which indicates whether an intervention to prevent a wheel blocking (ABS intervention) takes place or whether it is an intervention for preventing a drive slippage (ASR intervention), which is too high, or whether it is a driving stability intervention (ESP intervention).

Figure 10:
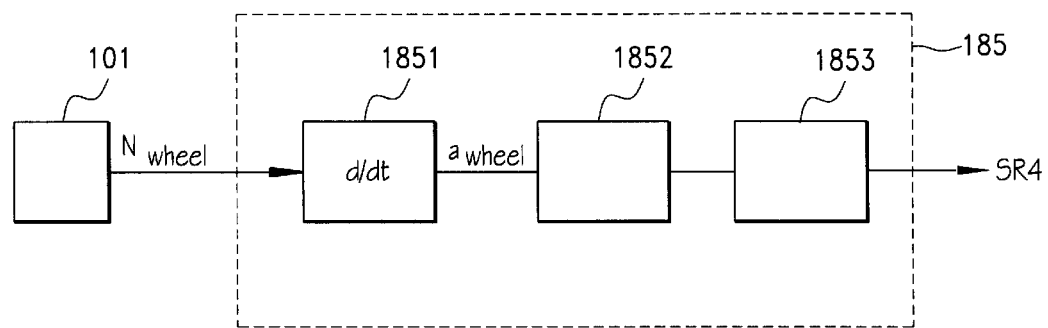

FIG. 10 shows a closer configuration of block 185 of FIG. 8. This embodiment relates to the detection of slipping wheels or the detection of a poor roadway.

The wheel rpms ($N_{wheel}$) of all vehicle wheels are available in the brake control apparatus 101. In the following, the signal of one wheel will be viewed by way of example. The signal $N_{wheel}$ is transmitted to the block 185 of the transmission control 18.

A slippage of the wheels, which can lead to a torque jump in the drive train, can be detected by the evaluation of the wheel rpms or the wheel accelerations. First, the wheel acceleration $a_{wheel}$ is determined by differentiation in the block 1851. The wheel acceleration can, of course, be supplied to the transmission control 18 directly from the brake control 101. In block 1852, the amount of the wheel acceleration is formed. A filtering, for example, via a $PT_1$ member can be provided. In block 1853, the safety reserve SR4 is determined in dependence upon the filtered amount of the wheel acceleration, for example, via a characteristic field.

Large changes of the wheel rpms occur also when driving over a poor roadway and this can be detected by evaluating the wheel acceleration. The value SR4 therefore also considers an uneven roadway.

Additional sensor signals can likewise be applied to detect a poor roadway, for example, the signals of an acceleration sensor which measures the chassis acceleration.

The following is noted with respect to the additional embodiments:

- of course, corresponding bit-coded signals can also be transmitted via CAN to the transmission control 18 (for example, the signals "brake actuated" or "brake light switch triggered", "ESP intervention active", "ABS intervention active on at least one drive wheel", "request for opening the converter clutch", "poor roadway detected", et cetera);
- for a high brake torque $M_{br}$, the converter clutch or the forward clutch (see FIG. 1) can be additionally opened. The CVT transmission 2 has here the possibility to disengage the drive by means of a forward clutch at least for a short time (so long until the converter clutch is closed). Here, a request for an opening of the converter clutch can be sent out by the control apparatus 101.

The safety reserve SR4 can also be dependent upon the yaw rate ω' and/or the transverse acceleration aq of the vehicle because a high yaw rate and/or a high transverse acceleration value permit a conclusion to be drawn as to possible torque jumps in the drive train.

4. Determination of the Safety Reserve in Dependence Upon the Distance Control (Block 187/FIG. 8):

As already mentioned initially herein, distance control systems 102 are known from the state of the art and these systems detect the spacing of a vehicle to a vehicle traveling ahead. If the distance becomes too small, then these systems provide for an intervention into the vehicle brakes independently of the driver. Even with such interventions, abrupt output end torque changes or torque incouplings are caused at the transmission. For this reason, the intervention signal ACC is supplied by the distance control system 102 in accordance with the invention to the transmission control 18 when such a brake intervention is present. Thereupon, the applied pressure $P_{sec,unc}$ is increased in block 187 (FIG. 8) by the safety value SR6.

Figure 11:
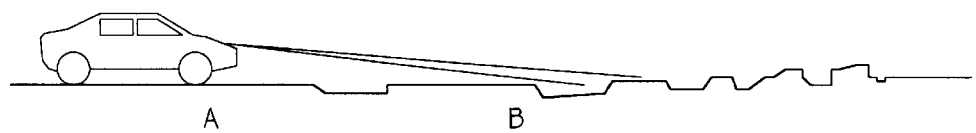
FIG. 11 shows principally the detection of the unevenness of the roadway. A flowchart of an embodiment can be taken from FIG. 12.

5. Determination of the Safety Reserve in Dependence Upon Roadway Unevenness (Block 186/FIG. 8):

The distance control systems 102 mentioned in the above section detect the distance to the vehicle driving ahead with radar sensors which are mounted in the forward region of the vehicle and have a range of approximately 150 meters (distance A to B in FIG. 11). The output signals of these radar sensors can also be used to determine the roadway surface structure or roadway characteristics of the roadway lying forward of the vehicle. A corresponding signal FB is formed in the unit 102 and is supplied to the transmission control 18. A schematic with respect hereto is shown in FIG. 11.

The signal FB represents the quality of the roadway which is to be driven by the vehicle in the immediate future. From the signal FB, the transmission control 18 receives data very early as to whether torque jumps at the output end are to be expected because of an uneven roadway (poor roadway). If this is the case, then a corresponding safety reserve SR5 is determined in block 186. In the simplest case, block 186 compares the signal FB, which represents the surface projections, to a threshold value.

In the sections up to now, the influence of a poor roadway was considered via the evaluation of the engine rpm or the wheel acceleration. With the signal FB, damage to the belt 1 can be countered much more effectively by increasing the applied pressure earlier.

Figure 12:
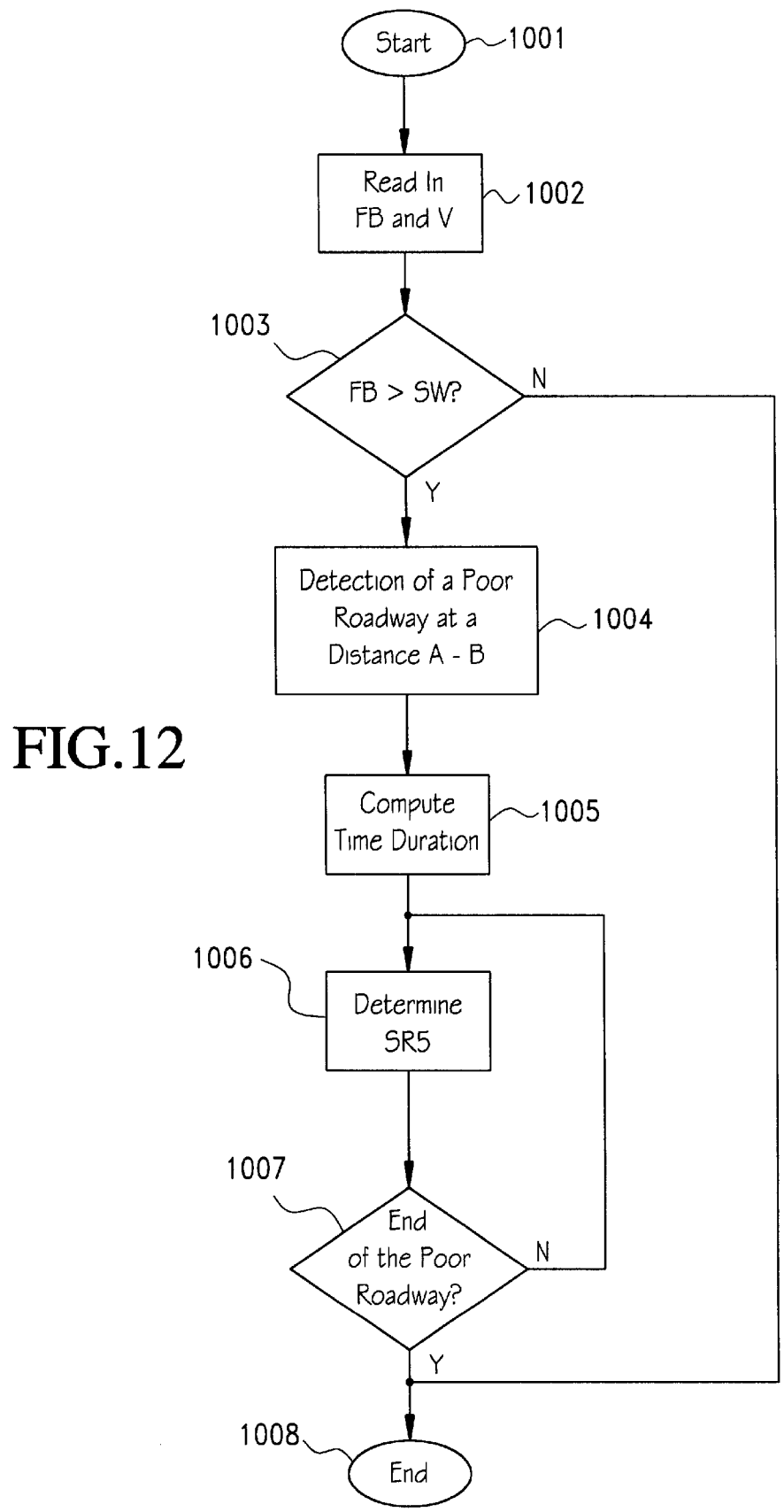

FIG. 12 shows a sequence as it can run in block 186.

After the start step 1001, the roadway value FB and the vehicle longitudinal velocity V (for example, determined in the braking control apparatus 101 from the wheel rpms) are read in in step 1002. In step 1003, the roadway value FB, which represents the roadway unevenness, is compared to the threshold value SW. If FB exceeds the value SW, then a poor roadway stretch is present in the spacing A–B (step 1004). If no poor roadway stretch lies ahead, then the program proceeds to end step 1008.

If a poor roadway stretch, which is to be driven, is detected in step 1004, then, in step 1005, the time duration until reaching the poor roadway section is determined from the distance A–B and the vehicle velocity V. In step 1006, the safety value SR5 is so determined that the applied pressure is increased to an adequate extent when the vehicle reaches the poor roadway section. It can also be provided that SR5 assumes a fixed value.

If in step 1007, the end of the poor roadway section is detected from the signal FB, then the program moves to the end step 1008.

Advantageously, the converter bridge clutch can then be partially or completely opened in step 1006 when a poor roadway section is driven over. This too leads to a reduction of the torque jumps in the drive train.

Sufficient time remains to open the converter bridge clutch via the early detection of a poor roadway section.

What is claimed is:

1. A system for adjusting the tension of a belt part of a continuously variable transmission, which is mounted downstream of a vehicle engine and is continuously variably adjustable with respect to its transmission ratio, the system comprising:

first means for controlling the vehicle engine;

second means for controlling the belt transmission;

said first means functioning to determine a first signal ($M_{mot}$) representing the engine torque of the vehicle engine and functioning to supply the first signal ($M_{mot}$) to said second means;

said first means further functioning to determine a second signal ($\Delta M_{mot}$), which represents the quality of said first signal ($M_{mot}$) and said first means functioning to supply said second signal ($\Delta M_{mot}$) to said second means;

means for determining a safety reserve (SR) in dependence upon said second signal ($\Delta M_{mot}$); and, said second means functioning to adjust said tension in dependence upon said first signal ($M_{mot}$) and said safety reserve (SR).

2. The system of claim 1, wherein the second signal ($\Delta M_{mot}$) represents, as quality, a fluctuation of the first signal which is at least possible.

3. The system of claim 1, wherein the second signal ($\Delta M_{mot}$) is determined in dependence upon tolerances ($\Delta$Tol) of at least one sensor, whose output signal is evaluated for controlling the vehicle engine; and, wherein said one sensor operates to do at least one of the following:

functions for the direct or indirect detection of the air mass supplied to the vehicle engine;

functions to detect a temperature, which is evaluated for controlling the vehicle engine; and, functions to detect characteristics of the exhaust gas of the vehicle engine whose output signals are applied for the detection of the air/fuel mixture supplied to the vehicle engine.

4. The system of claim 1, wherein the second signal ($\Delta M_{mot}$) is determined in dependence upon a detected fault function in the operation of the vehicle engine wherein it is provided that a fault function ($\Delta$FF) is detected when at least one of the following occur:

(a) combustion misfires are detected in one or several of the cylinders of the vehicle engine by evaluating the detected engine rpm ($N_{mot}$);

(b) a fault function of a sensor is detected and the output signal of the sensor is evaluated for the control of the vehicle engine; and, (c) an emergency of the first means is present and includes an electrical emergency thereof; and, (d) the fuel metering to individual cylinders of the vehicle engine is interrupted in reaction to a detected fault.

5. The system of claim 1, wherein the second signal ($\Delta M_{mot}$) is determined in dependence upon the detected rough running of the vehicle engine wherein it is especially provided that the detection of the rough running ($\Delta$LU) is dependent one of the following:

(a) mechanical oscillations including torsion oscillations are present in the drive train of the vehicle;

(b) the fuel metering to individual cylinders of the vehicle engine is interrupted;

(c) said first means controls the vehicle engine in such a manner that oscillations in the drive train are countered (anti-bucking function, load impact damping);

(d) a switchover between various modes of operation of the vehicle engine takes place;

(e) it is detected that a pregivable roadway quality is present (poor roadway detection); and, (f) the fuel tank is almost empty.

6. The system of claim 1, wherein the second signal ($\Delta M_{mot}$) is determined in dependence upon stored adaptation values which represent the rough running of the vehicle engine and it is provided that the adaptation values are stored in dependence upon at least one of load and rpm.

7. The system of claim 1, wherein the second signal ($\Delta M_{mot}$) is determined in dependence upon inaccuracies which occur in the determination of the first signal and wherein at least one of the following take place:

the second signal ($\Delta M_{mot}$) is determined in dependence upon the rpm of the vehicle engine; and, an adaptation of at least one of the friction torque or loss torque is performed in idle of the vehicle engine via the first means and the second signal ($\Delta M_{mot}$) is determined in dependence upon whether the adaptation is completed or not.

8. The system of claim 1, wherein the safety reserve (SR) is determined so that at least one of the following occurs:
(a) the tension of the belt part is increased when a lesser quality of the first signal ($\Delta M_{mot}$) is present compared to the adjustment of the tension when a higher quality of the first signal is present;
(b) the tension of the belt part is increased when at least one of a higher wear, a deterioration of greater extent is present compared to the adjustment of the tension when a lower wear and a deterioration of lesser extent is present;
(c) the tension of the belt part is increased when at least one of a braking action, a yaw movement and transverse movement of a greater extent is present compared to the adjustment of the tension for at least one of a braking action, a yaw movement and a transverse movement of lesser extent;
(d) the tension of the belt part is increased when a greater rpm or a greater change of the rpm of at least one vehicle wheel is present compared to the adjustment of the tension when a lower rpm or a lower change of the rpm is present;
(e) the tension of the belt part is increased when a braking intervention is present; and,
(f) the tension of the belt part is increased when a roadway unevenness of greater extent is present compared to the adjustment of the tension for a roadway unevenness of lesser extent.

9. The system of claim 1, wherein a tension value is determined which is dependent upon the first signal ($M_{mot}$), the tension value being modified in dependence upon the safety reserve (SR) and it is provided that the adjustment of the tension takes place hydraulically and the tension is adjusted by inputting at least one pressure value ($P_{sec,cor}$) and a pressure value ($P_{sec,uncor}$) is determined in dependence upon the first signal ($M_{mot}$) and the pressure value ($P_{sec,uncor}$) is modified in dependence upon the safety reserve (SR).

10. A system for adjusting the tension of a belt part of a continuously variable transmission, which is mounted downstream of a vehicle engine and is continuously variably adjustable with respect to its transmission ratio, the system comprising:
first means for controlling the vehicle engine;
second means for controlling the belt transmission;
said first means functioning to determine a first signal ($M_{mot}$) representing the engine torque of the vehicle engine and functioning to supply the first signal ($M_{mot}$) to said second means;
means for determining a deterioration value (AW), which represents the deterioration of at least one of the belt part and the wear thereof;
means for determining a safety reserve (SR) in dependence upon said deterioration value (AW); and, said second means functioning to adjust said tension in dependence upon said first signal ($M_{mot}$) and said safety reserve (SR).

11. The system of claim 10, wherein the deterioration value (AW) is determined in dependence upon the operating duration of the belt part and it is especially provided that the deterioration value (AW) is furthermore determined in dependence upon the operating conditions, which are present during the operating duration, the operating conditions being at least one of the following: the driving performance of the driver, operating temperature and slip of the belt part.

12. The system of claim 10, wherein the deterioration value (AW) is determined in the second means and is there non-volatilely stored.

13. A system for adjusting the tension of a belt part of a continuously variable transmission, which is mounted downstream of a vehicle engine and is continuously variably adjustable with respect to its transmission ratio, the system comprising:
first means for controlling the vehicle engine;
second means for controlling the belt transmission;
said first means functioning to determine a first signal ($M_{mot}$) representing the engine torque of the vehicle engine and functioning to supply the first signal ($M_{mot}$) to said second means;
third means for providing an additional signal ($M_{br}$, $\omega'$, aq) which represents at least one of: the braking action to be adjusted on the vehicle wheels; and, the yaw movement; and, the transverse movement of the vehicle;
said third means functioning to supply said additional signal ($M_{br}$, $\omega'$, aq) to said second means;
means for determining a safety reserve (SR) in dependence upon said additional signal ($M_{br}$,$\omega'$, aq); and, said second means functioning to adjust said tension in dependence upon said first signal ($M_{mot}$) and said safety reserve (SR).

14. A system for adjusting the tension of a belt part of a continuously variable transmission, which is mounted downstream of a vehicle engine and is continuously variably adjustable with respect to its transmission ratio, the system comprising:
first means for controlling the vehicle engine;
second means for controlling the belt transmission;
said first means functioning to determine a first signal ($M_{mot}$) representing the engine torque of the vehicle engine and functioning to supply the first signal ($M_{mot}$) to said second means;
third means for supplying an additional signal ($N_{wheel}$, $a_{wheel}$) to the second means;
said additional signal ($N_{wheel}$, $a_{wheel}$) representing the rpm or the change of the rpm of at least one vehicle wheel;
means for determining a safety reserve (SR) in dependence upon said additional signal; and,
said second means functioning to adjust said tension in dependence upon said first signal ($M_{mot}$) and said safety reserve (SR).

15. The system of claim 14, wherein said additional signal ($N_{wheel}$, $a_{wheel}$) is supplied to the second means by said third means and said third means is configured as at least one of: an anti-blocking control system, a drive slip control system and a driving stability control system with which a brake torque can be adjusted for increasing the driving stability, the brake torque acting on the vehicle wheels.

16. A system for adjusting the tension of a belt part of a continuously variable transmission, which is mounted downstream of a vehicle engine and is continuously variably adjustable with respect to its transmission ratio, the system comprising:
first means four controlling the vehicle engine;
second means for controlling the belt transmission;
said first means functioning to determine a first signal ($M_{mot}$) representing the engine torque of the vehicle engine and functioning to supply the first signal ($M_{mot}$) to said second means;

third means for distance control and for determining an intervention signal (ACC) in dependence upon the detected distance to the vehicle driving ahead and via which an intervention into the brake system of the vehicle is triggered or prepared;

means for determining a safety reserve (SR) in dependence upon said intervention signal (ACC); and, said second means functioning to adjust said tension in dependence upon said first signal ($M_{mot}$) and said safety reserve (SR).

17. A system for adjusting the tension of a belt part of a continuously variable transmission, which is mounted downstream of a vehicle engine and is continuously variably adjustable with respect to its transmission ratio, the system comprising:

first means for controlling the vehicle engine;

second means for controlling the belt transmission;

said first means functioning to determine a first signal ($M_{mot}$) representing the engine torque of the vehicle engine and functioning to supply the first signal ($M_{mot}$) to said second means;

third means for determining a roadway value (FB) at least via a sensor including a radar sensor, and wherein said roadway value (FB) represents the roadway unevenness of the roadway to be driven over by the vehicle;

means for determining a safety reserve (SR) in dependence upon said roadway value (FB); and, said second means functioning to adjust said tension in dependence upon said first signal ($M_{mot}$) and said safety reserve (SR).

18. The system of claim 17, wherein at least one clutch, especially a converter bridging clutch, is provided via which the torque converter can be bridged, the torque converter being provided in the drive train, and the clutch is opened in dependence upon the roadway value (FB) and on detected fault cases including combustion misfires.

* * * * *